United States Patent
Yang et al.

(10) Patent No.: US 9,073,564 B2
(45) Date of Patent: Jul. 7, 2015

(54) COLLAPSIBLE WAGON AND METHOD OF COLLAPSING A WAGON

(75) Inventors: Baoqing Yang, HangZhou (CN); Matthew Abernathy, Indianapolis, IN (US)

(73) Assignee: Westfield Outdoor, Inc., Indianapolis, IN (US)

( * ) Notice: Subject to any disclaimer, the term of this patent is extended or adjusted under 35 U.S.C. 154(b) by 222 days.

(21) Appl. No.: 13/537,663

(22) Filed: Jun. 29, 2012

(65) Prior Publication Data

US 2014/0001735 A1    Jan. 2, 2014

(51) Int. Cl.
| B62B 1/00 | (2006.01) |
| B62B 3/02 | (2006.01) |
| B62B 3/00 | (2006.01) |
| B62B 5/06 | (2006.01) |

(52) U.S. Cl.
CPC . *B62B 3/02* (2013.01); *B62B 5/067* (2013.01); *B62B 3/007* (2013.01); *B62B 2205/06* (2013.01)

(58) Field of Classification Search
CPC ............ B62B 3/02; B62B 3/007; B62B 3/00; B62B 2205/00; B62B 2205/02; B62B 2205/04; B62B 2205/06; B62B 1/12; B62B 1/125; B62B 1/20; B62B 1/208
USPC ........... 280/651, 638, 639, 654, 42, 640, 656, 280/659
See application file for complete search history.

(56) References Cited

U.S. PATENT DOCUMENTS

| | | | |
|---|---|---|---|
| 1,771,836 A | 7/1930 | Beckham | |
| 1,919,103 A * | 7/1933 | Dolge | 280/640 |
| 1,998,269 A | 4/1935 | Brown | |
| 2,016,232 A | 10/1935 | Floyd | |
| 2,020,766 A * | 11/1935 | Brown Reinhardt | 280/639 |
| 2,036,455 A | 4/1936 | Brown | |
| 2,049,683 A * | 8/1936 | Baumgardner | 280/640 |
| 2,421,751 A * | 6/1947 | Giordano | 280/645 |
| D177,208 S | 3/1956 | Berlin | |
| 3,945,660 A * | 3/1976 | Zalewski | 280/42 |
| 4,055,357 A * | 10/1977 | Sorocin | 280/641 |
| 4,735,426 A | 4/1988 | McConnell | |
| 5,222,748 A | 6/1993 | Johnson | |
| 5,649,718 A * | 7/1997 | Groglio | 280/641 |
| 5,915,723 A * | 6/1999 | Austin | 280/651 |
| 6,179,374 B1 | 1/2001 | Tang | |
| 6,260,566 B1 | 7/2001 | LaFave et al. | |
| 6,276,548 B1 | 8/2001 | Mitchell | |
| 6,354,619 B1 | 3/2002 | Kim | |
| 6,438,773 B1 | 8/2002 | Hsia | |

(Continued)

*Primary Examiner* — J. Allen Shriver, II
*Assistant Examiner* — James M Dolak
(74) *Attorney, Agent, or Firm* — Thompson Coburn LLP

(57) ABSTRACT

A collapsible wagon comprises a frame, four wheels, a pliable liner, and a telescoping tow handle. The frame has four sides that are each formed by a respective scissor-bar assembly. The frame also has a vertically oriented telescoping pole assembly at the intersection of each pair of the scissor-bar assemblies. The frame is configured such that, as the wagon is altered from its expanded to its collapsed configuration, the scissor-bar assemblies and the telescoping pole assemblies increase in height and the scissor-bar assemblies decrease in width. Each of the four wheels is attached to a bottom end portion of a respective one of the telescoping pole assemblies. The pliable liner is connected to the frame and defines an open-top interior compartment of the wagon when the wagon is in its expanded configuration. The telescoping tow handle is adjustable between collapsed and expanded configurations.

12 Claims, 5 Drawing Sheets

(56) References Cited

U.S. PATENT DOCUMENTS

| | | | |
|---|---|---|---|
| 6,491,318 B1 | 12/2002 | Galt et al. | |
| 6,845,991 B1* | 1/2005 | Ritucci et al. | 280/30 |
| 6,929,230 B2 | 8/2005 | Tsai | |
| 7,097,182 B1* | 8/2006 | Liu | 280/42 |
| 7,131,364 B2 | 11/2006 | Brazell | |
| 7,163,228 B2 | 1/2007 | Faber | |
| D551,723 S | 9/2007 | Schlegel et al. | |
| D551,724 S | 9/2007 | Seckel et al. | |
| 7,281,731 B2* | 10/2007 | Shamah | 280/639 |
| 7,503,085 B2 | 3/2009 | Harrison et al. | |
| 7,547,037 B2* | 6/2009 | Poppinga et al. | 280/651 |
| 7,625,033 B2 | 12/2009 | Michelau et al. | |
| 7,731,221 B2 | 6/2010 | Bess | |
| 7,770,913 B2* | 8/2010 | Cannon | 280/656 |
| 8,011,686 B2* | 9/2011 | Chen et al. | 280/651 |
| 8,024,825 B2 | 9/2011 | Harrison et al. | |
| 8,162,349 B1* | 4/2012 | Roselle | 280/654 |
| 8,220,824 B2* | 7/2012 | Chen et al. | 280/651 |
| 8,388,015 B2* | 3/2013 | Chen | 280/647 |
| 8,882,136 B2* | 11/2014 | Glaser et al. | 280/728.3 |
| 2003/0025301 A1* | 2/2003 | Banuelos, III | 280/651 |
| 2008/0217886 A1 | 9/2008 | Poppinga et al. | |
| 2010/0090444 A1 | 4/2010 | Chen et al. | |
| 2010/0156069 A1 | 6/2010 | Chen | |

* cited by examiner

COLLAPSIBLE WAGON AND METHOD OF COLLAPSING A WAGON

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to hand-drawn wagons. More particularly, the present invention pertains to a hand-drawn wagon that is collapsible in a manner such that the wagon can be stored in a minimal amount of space.

2. General Background

Hand-drawn wagons typically have an open-top cuboid compartment for holding and transporting things, including children. Such wagons also typically comprise four wheels for supporting the wagons from surfaces. Typically, two of the wheels of such a wagon are able to pivot with respect to the remaining wheels in a manner allowing the wagon to be steered. Such a wagon also typically comprises a tow handle that is configured to be pulled by an individual to move and steer the wagon.

In addition to the foregoing, some wagons are configured to be collapsible. A collapsible wagon typically has a collapsible frame and a pliable liner that forms the compartment of the wagon. When such a wagon is collapsed, the pliable liner folds-in on itself as the frame collapses. However, not all collapsible wagons are easy to collapse, and with some, it is difficult to ensure that the pliable liner folds properly during the process of collapsing the wagon. Furthermore, not all collapsible wagons can be sufficiently collapsed and some have relatively flimsy frames.

SUMMARY OF THE INVENTION

The present invention pertains to a collapsible wagon that has a strong and robust configuration, and yet is easily collapsed and easily expanded. Furthermore, in its collapsed state, the wagon is highly compact.

In one aspect of the invention, a wagon is adjustable between an expanded configuration and a collapsed configuration. The wagon comprises a frame, four wheels, a pliable liner, and a telescoping tow handle. The frame has four sides. Each side is formed by a respective scissor-bar assembly. The frame also has a vertically oriented telescoping pole assembly at the intersection of each pair of the scissor-bar assemblies. The frame is configured such that as the wagon is altered from its expanded to its collapsed configuration the scissor-bar assemblies and the telescoping pole assemblies increase in height and the scissor-bar assemblies decrease in width. Each of the four wheels is attached to a bottom end portion of a respective one of the telescoping pole assemblies. The pliable liner is connected to the frame and defines an open-top interior compartment of the wagon when the wagon is in its expanded configuration. The telescoping tow handle is adjustable between collapsed and expanded configurations.

In another aspect of the invention, a wagon is adjustable between an expanded configuration and a collapsed configuration. The wagon comprises a frame, four wheels, a pliable liner, and a tow handle. The frame has four sides. Each side is formed by a respective scissor-bar assembly. The frame also has a vertically oriented telescoping pole assembly at the intersection of each pair of the scissor-bar assemblies. The frame is configured such that as the wagon is altered from its expanded to its collapsed configuration the scissor-bar assemblies and the telescoping pole assemblies increase in height and the scissor-bar assemblies decrease in width. Each of two of the scissor-bar assemblies comprises a single pair of crossed bars and each of the other two of the scissor-bar assemblies comprises a plurality of pairs of crossed bars connected to each other. Each of the four wheels is attached to a bottom end portion of a respective one of the telescoping pole assemblies. The pliable liner is connected to the frame and defines an open-top interior compartment of the wagon when the wagon is in its expanded configuration. The tow handle is connected to the frame.

Yet another aspect of the invention pertains to a method of collapsing a wagon. The wagon comprises a frame, a collapsible tow handle, and a pliable liner. The frame has four sides. Each side is formed by a respective scissor-bar assembly. The frame also has a vertically oriented telescoping pole assembly at the intersection of each pair of the scissor-bar assemblies. The method comprises adjusting the frame of the wagon from an expanded configuration to a collapsed configuration in a manner causing the scissor-bar assemblies and the telescoping pole assemblies to increase in height and the scissor-bar assemblies to decrease in width. The pliable liner is collapsed in the process.

Further features and advantages of the present invention, as well as the operation of the invention, are described in detail below with reference to the accompanying drawings.

Figure 1:
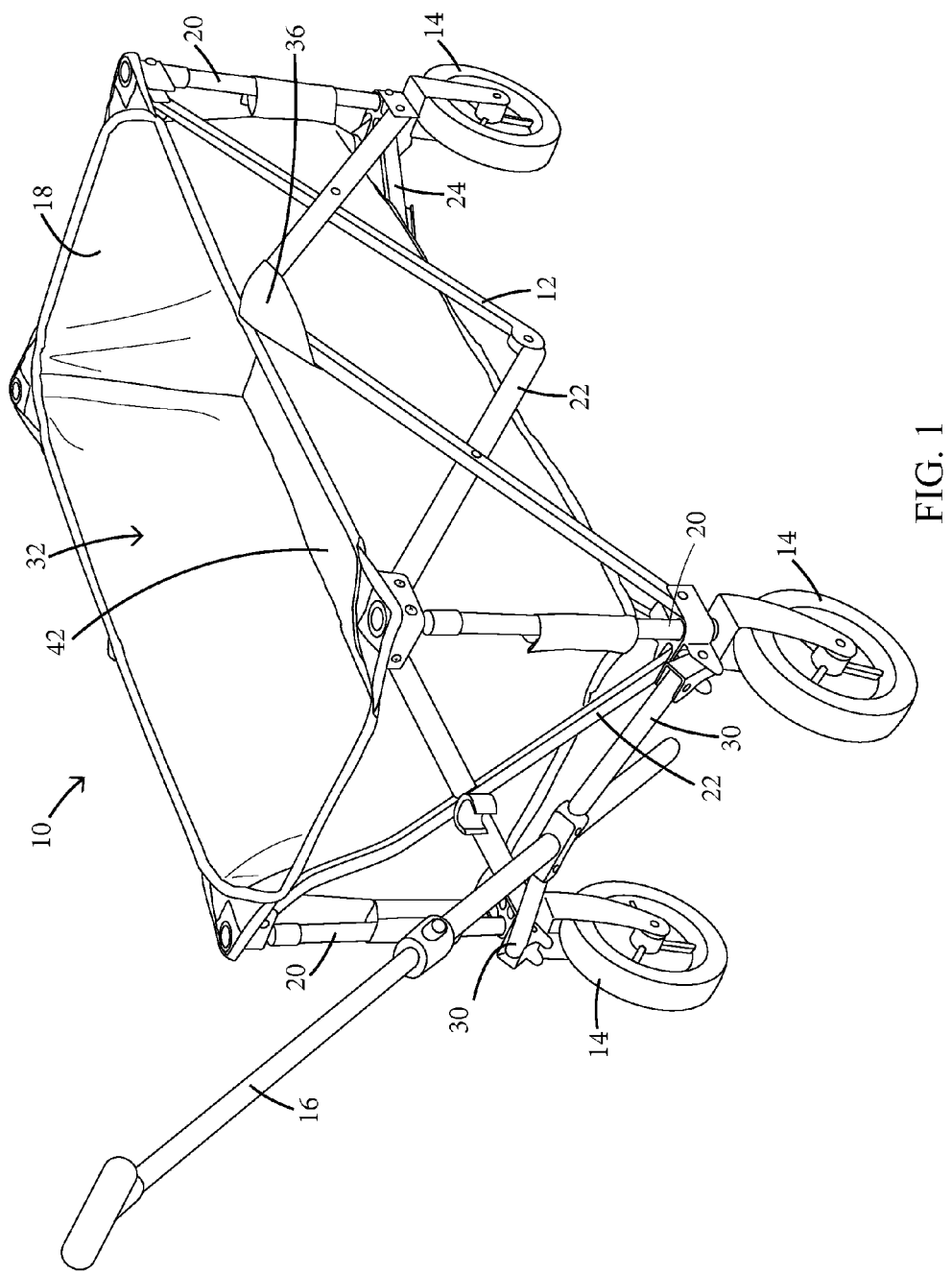
FIG. 1 depicts a perspective view of a wagon in accordance with the invention in its expanded configuration.

Reference numerals in the written specification and in the drawing figures indicate corresponding items.

DETAILED DESCRIPTION

A preferred embodiment of a collapsible wagon 10 in accordance with the present invention is shown in FIGS. 1-5. The collapsible wagon 10 comprises a frame 12, a plurality of wheels 14, a tow handle 16, and a pliable liner 18.

Figure 2:
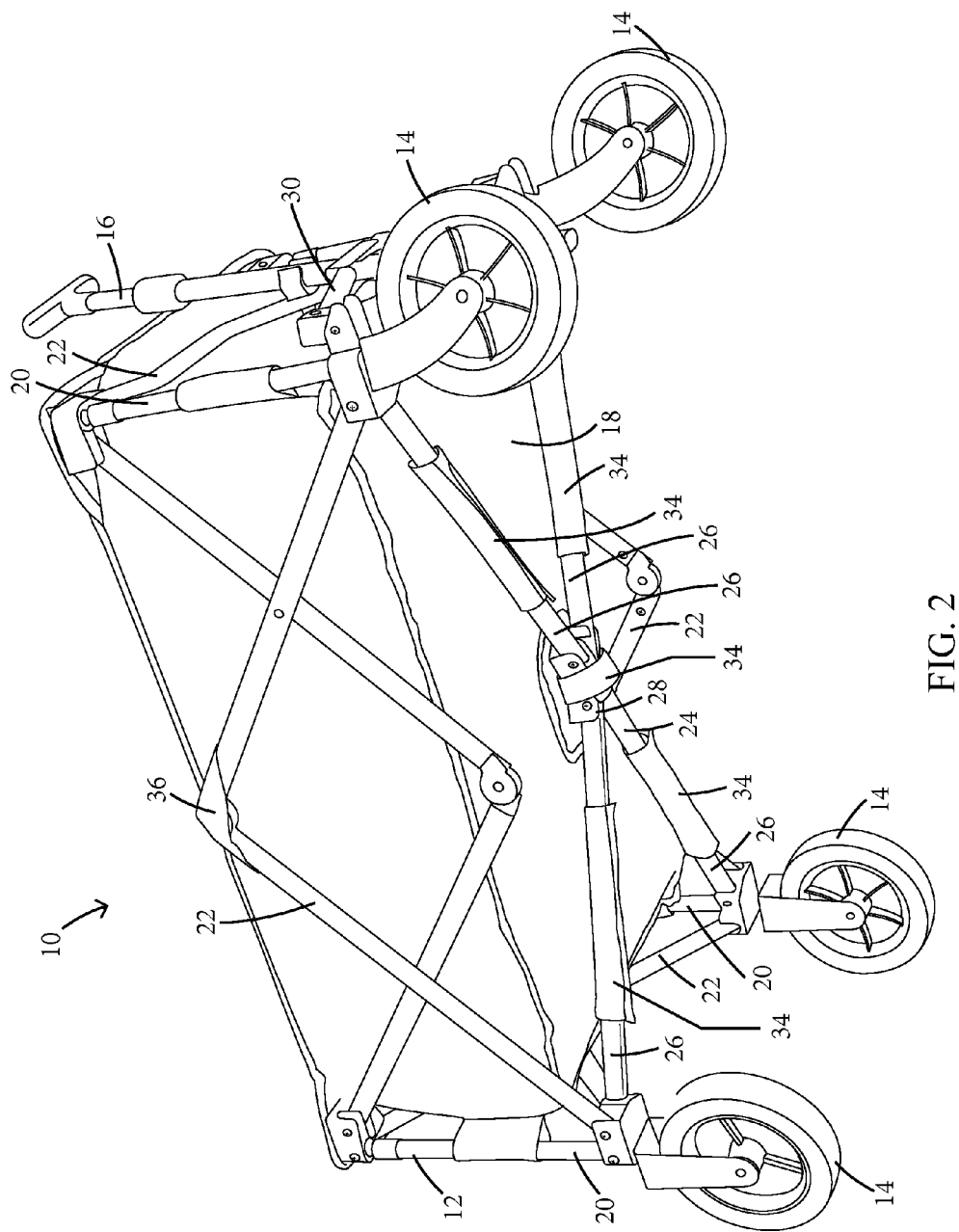
FIG. 2 depicts a perspective view of the wagon showing the bottom side of the wagon in its expanded configuration.
Figure 4:
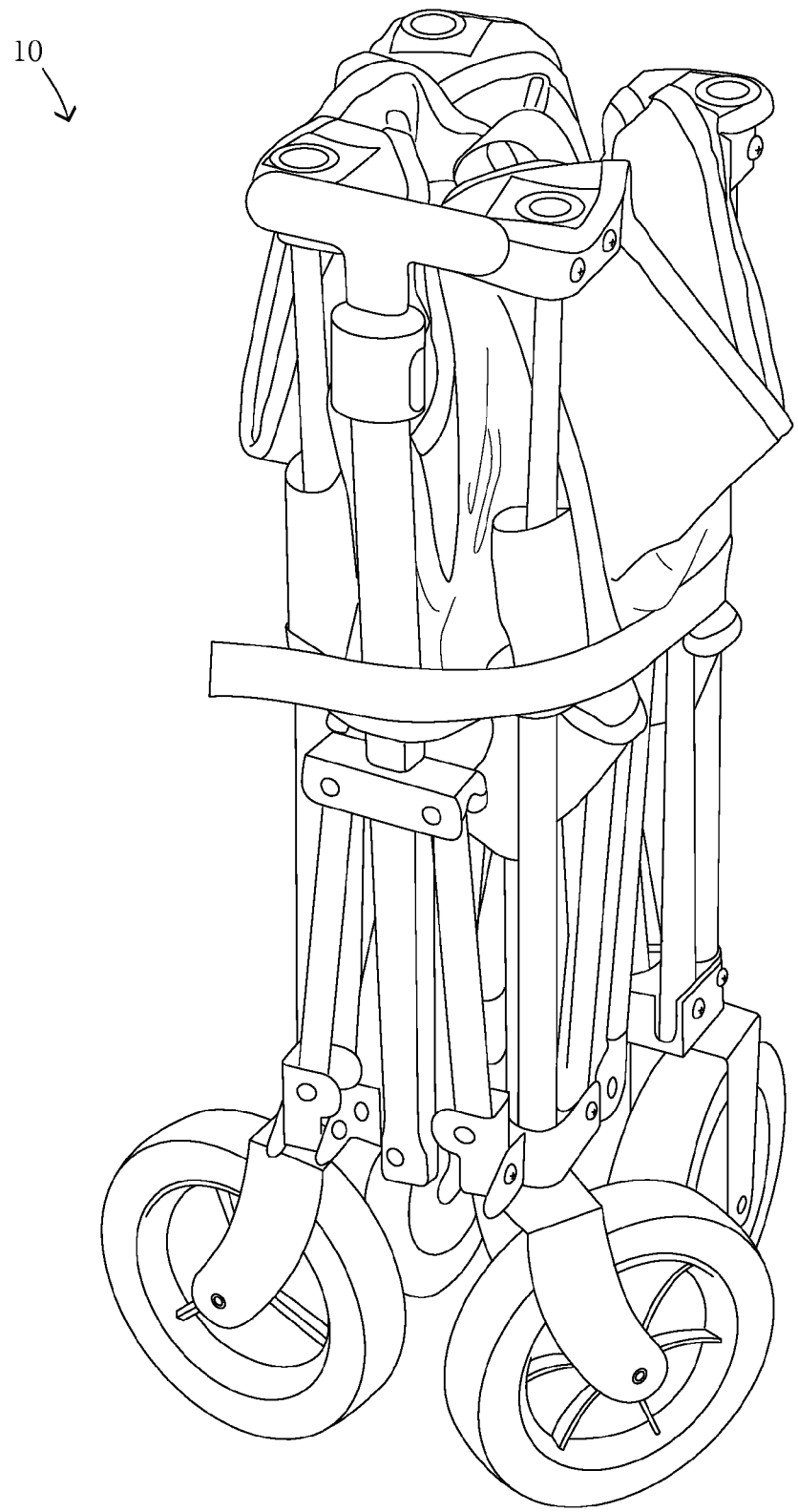
FIG. 4 depicts a perspective view of the wagon in its collapsed state.

The frame 12 of the wagon 10 includes four telescoping pole assemblies 20 and four scissor-bar assemblies 22. Each of the four telescoping pole assemblies 20 preferably includes an upper tube member that is slideably received in a lower tube member in a manner such that the upper tube member can partially retract into the lower tube member. Thus, each telescoping pole assembly 20 can be adjusted between an expanded configuration and a collapsed configuration. Each scissor-bar assembly 22 comprises at least one pair of crossed bars that are pivotally joined to each other. Preferably, two of the scissor-bar assemblies 22 each comprise a single pair of crossed bars, while the other two scissor-bar assemblies each comprise two attached pairs of the crossed bars. Each scissor-bar assembly 22 has left and right upper corner portions and left and right lower corner portions. As is typical with most scissor-bar assemblies in general, each scissor-bar assembly 22 is adjustable between an expanded configuration and a collapsed configuration. The upper corner portions of each of the scissor-bar assemblies 22 are closer to the corresponding lower corner portions thereof when the said scissor-bar assembly is in the expanded configuration (as shown in FIGS. 1 and 2) as compared to the collapsed configuration (as shown in FIG. 4). Similarly, the upper corner portions of each of the scissor-bar assemblies 22 are closer to each other when said scissor-bar assembly is in the collapsed configuration as compared to the expanded configuration.

Figure 3:
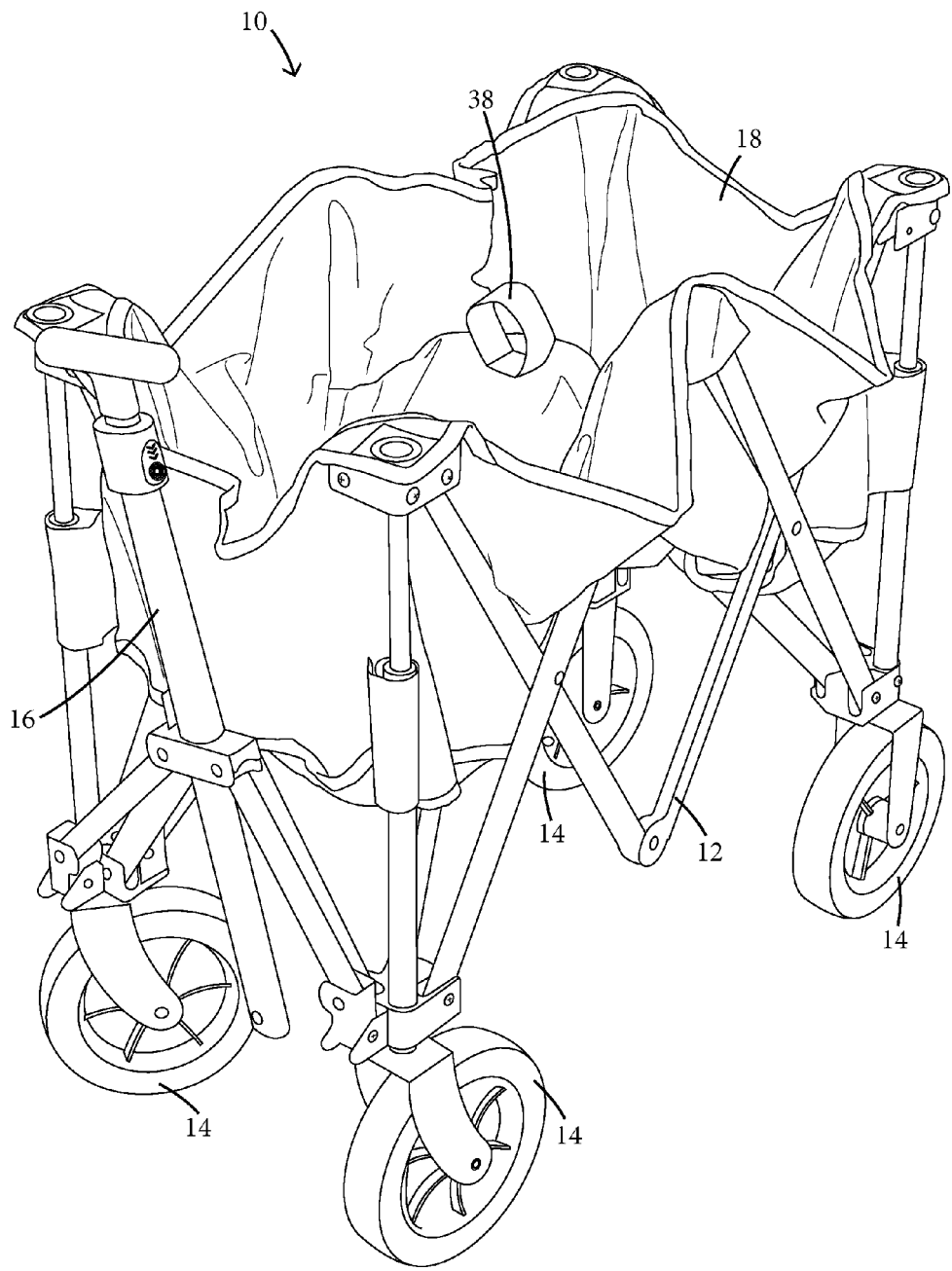
FIG. 3 depicts a perspective view of the wagon in a partially collapsed/expanded state.

The top end portion of each of the telescoping pole assemblies 20 is pivotally connected to the left upper corner portion of a one of the scissor-bar assemblies 22 and to the right upper corner portion of another one of the scissor-bar assemblies. Similarly, the lower end portion of each of the telescoping pole assembly 20 is pivotally connected to the left lower corner portion of the corresponding scissor-bar assembly 22 and to the right lower corner portion of the other corresponding scissor-bar assembly. As such, the telescoping pole assemblies 20 adjust from their expanded configuration to their collapsed configuration as the scissor-bar assemblies 22 adjust from their collapsed configuration to their expanded configuration and each of the telescoping pole assemblies moves toward each of the other telescoping pole assemblies as the scissor-bar assemblies adjust from their expanded configuration to their collapsed configuration. Thus, as can be seen in FIGS. 1, 3, and 4, as the wagon 10 collapses, the telescoping pole assemblies 20 expand in height together with the scissor-bar assemblies.

The frame 12 of the wagon 10 also preferably comprises a collapsible bottom support assembly 24. The bottom support assembly preferably comprises four bars 26 that are each pivotally connected to a central hub 28 and extend therefrom. Each of the four bars 26 is also pivotally connected to the bottom end portion of a respective one of the one of the telescoping pole assemblies 20. As the wagon 10 is collapsed, the central hub 28 moves upward. The central hub 28 is preferably configured to limit the extent to which the bars 26 can pivot relative to the central hub, such that central hub cannot be moved lower than being in plane with the bars 26 of the bottom support assembly 24. Thus, when the wagon 10 is in its expanded configuration, the bottom support assembly 24 is capable of supporting a downward acting load. Thus the liner 18 needs not carry the entire load of cargo placed in the wagon 10.

Each of the wheels 14 of the wagon 10 is attached to the lower portion of a respective one of the telescoping pole assemblies 20. Preferably, the two wheels 14 nearest the tow handle 16 are able to pivot about vertical axes (in addition to being able to rotate on their horizontal axles). The other two wheels 14 preferably are not.

The tow handle 16 preferably comprises two telescopically attached sections. The telescoping tow handle 16 is preferably connected to the lower portion of the nearest two of the telescoping pole assemblies 20 via two connecting members 30. Each of the connecting members 30 has a first end portion that is pivotally connected to the bottom end portion of the respective telescoping pole assembly 20, and an opposite second end portion that is pivotally connected to the telescoping tow handle 16. Each connecting member 30 extends upward in a sloped manner from the bottom portion of the respective telescoping pole assembly 20 to the telescoping tow handle 16 such that the second end portions of the connecting members move upward relative to the bottom end portions of the telescoping pole assemblies as the wagon 10 is collapsed. When the wagon 10 is collapsed, the telescoping tow handle 16 can also be collapsed such that it does not extend above the frame 12 of the wagon.

The pliable liner 18 of the wagon 10 rests inside the frame 12 when the wagon is expanded and forms the open-top interior compartment 32 of the wagon. Each upper corner of the pliable liner is attached to the top portion of a respective one of the telescoping pole assemblies 20. The pliable liner 18 also preferably comprises a plurality of flaps 34 having looped fasteners (such as Velcro®) that extend downward from the base of the pliable liner. The flaps 34 secure the base of the pliable liner 18 to the bars 26 and the central hub 28 of the frame 12. The pliable liner 18 preferably further includes a pair of inverted pockets 36 and a pliable fabric handle 38. The inverted pockets 36 are configured to receive the top-center portion of each of the side scissor-bar assemblies 22 for supporting the pliable liner 18 therefrom (as shown in FIG. 1). The fabric handle 38 is configured to allow the center portion of the pliable liner 18 to be pulled upward. Pulling upward on the fabric handle 38 causes the pliable liner 18 to pull upward on the bottom support assembly 24 of the frame 12 of the wagon 10. That pulling force moves the central hub 28 of the bottom support assembly 24 of the frame 12 upward and collapses the wagon 10 with a minimal amount of effort.

Figure 5:
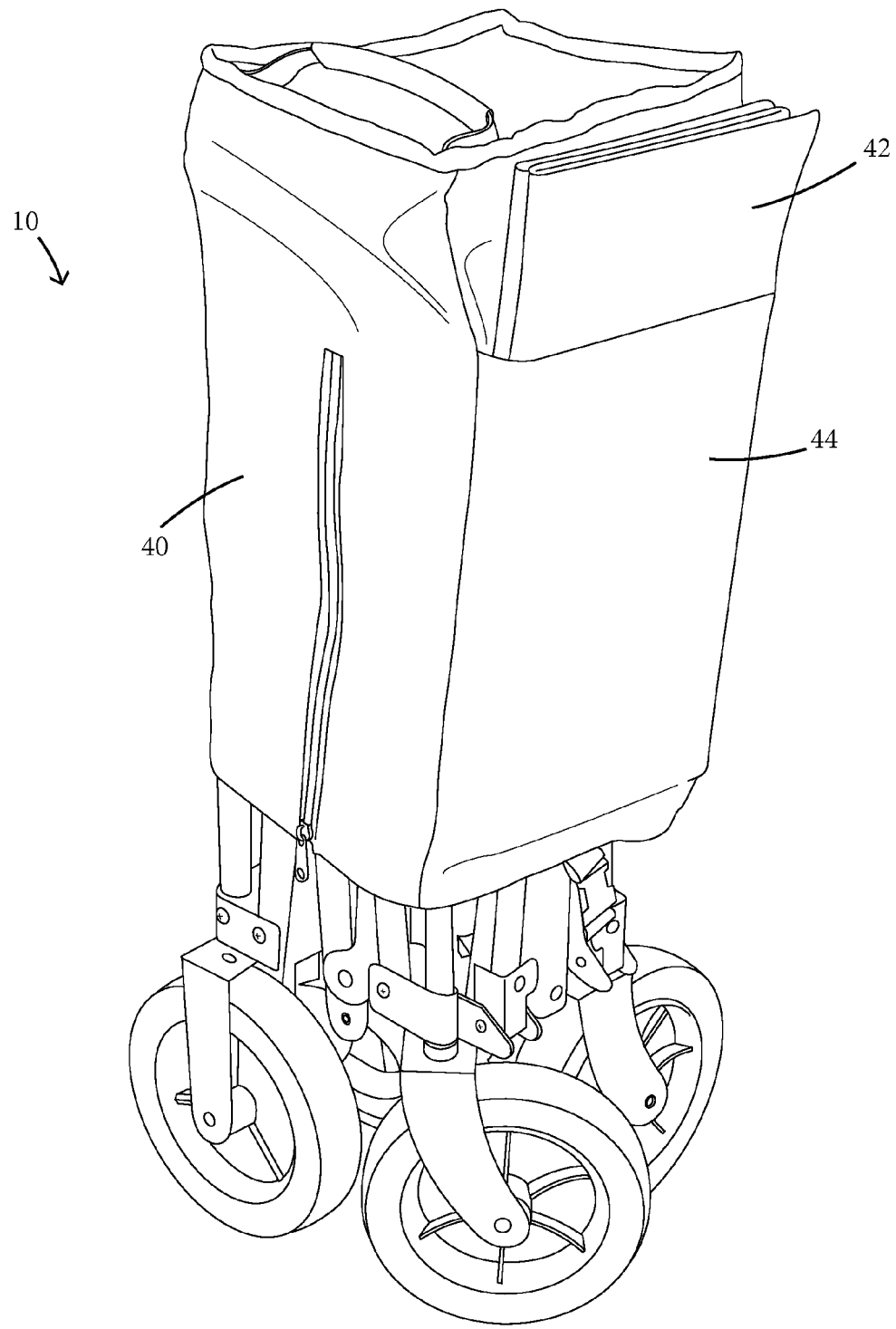
FIG. 5 depicts a perspective view of the wagon in its collapsed state and is shown with an optional cover fitted thereover.

The wagon 10 is preferably sold with a cover 40 and a stiffening panel 42. As shown in FIG. 5, the cover 40 is configured to protect the wagon 10 when the wagon is in its collapsed condition. It also reduces the likelihood that things will get snagged on the wagon 10 when the wagon 10 is in storage. The cover 40 also includes a pocket 44 for holding the stiffening panel 42 when the wagon 10 is in its collapsed condition. The stiffening panel 42 is comprised of four adjacent panels that are wrapped in fabric in a manner such that the stiffening panel can be folded like an accordion. When unfolded, the stiffening panel 42 can be placed in the bottom of the interior compartment 32 of the wagon 10. The stiffing panel 42 helps distribute loads of any cargo being carried in the wagon 10 more evenly to the bottom support assembly 24 of the frame 12 and prevents the components of the bottom support assembly from being felt by children riding in wagon.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such and order is inherent.

What is claimed is:

1. A wagon that is adjustable between an expanded configuration and a collapsed configuration, the wagon comprising:
   a frame, the frame having four sides, each side being formed by a respective scissor-bar assembly, the frame also having a vertically oriented telescoping pole assembly at the intersection of each pair of the scissor-bar assemblies, the frame being such that as the wagon is altered from the wagon's expanded configuration to the wagon's collapsed configuration the scissor-bar assemblies and the telescoping pole assemblies increase in height and the scissor-bar assemblies decrease in width;
   four wheels, each being attached to a bottom end portion of a respective one of the telescoping pole assemblies;
   a pliable liner that is connected to the frame and that defines an open-top interior compartment of the wagon when the wagon is in the wagon's expanded configuration; and
   a telescoping tow handle, the telescoping tow handle being adjustable between collapsed and expanded configurations.

2. The wagon in accordance with claim 1 wherein the tow handle is connected to two of the telescoping pole assemblies via two connecting members, each of the connecting members has a first end portion that is pivotally connected to the bottom end portion of the respective telescoping pole assembly and an opposite second end portion that is pivotally connected to the tow handle, each of the connecting members extends upward in a sloped manner from the bottom end portion of the respective telescoping pole assembly to the tow handle such that the second end portions of the connecting members move upward relative to the bottom end portions of the telescoping pole assemblies as the wagon is adjusted from the wagon's expanded configuration to the wagon's collapsed configuration.

3. The wagon in accordance with claim 1 wherein the tow handle has a top end and is configured such that, when the wagon is in the wagon's collapsed configuration and the tow handle is vertical and in the tow handle's collapsed configuration, the top end of the tow handle does not protrude substantially above the remainder of the wagon.

4. The wagon in accordance with claim 1 wherein each of two of the scissor-bar assemblies comprises a single pair of crossed bars and each of the other two of the scissor-bar assemblies comprises a plurality of pairs of crossed bars connected to each other.

5. The wagon in accordance with claim 1 wherein the wagon further comprises a collapsible bottom support assembly, the bottom support assembly comprises a central hub and four bars, the four bars are each pivotally connected to the central hub and to the bottom end portion of a respective one of the telescoping pole assemblies.

6. The wagon in accordance with claim 5 wherein the central hub allows each of the four bars of the bottom support assembly to pivot downward therefrom and prevents the four bars from pivoting upward therefrom beyond horizontal.

7. The wagon in accordance with claim 1 further comprising a removable stiffing panel that is configured and adapted to be placed at the bottom of the interior compartment of the wagon.

8. A wagon that is adjustable between an expanded configuration and a collapsed configuration, the wagon comprising:
   a frame, the frame having four sides, each side being formed by a respective scissor-bar assembly, the frame also having a vertically oriented telescoping pole assembly at the intersection of each pair of the scissor-bar assemblies, the frame being such that as the wagon is altered from the wagon's expanded configuration to the wagon's collapsed configuration the scissor-bar assemblies and the telescoping pole assemblies increase in height and the scissor-bar assemblies decrease in width, each of two of the scissor-bar assemblies comprising a single pair of crossed bars and each of the other two of the scissor-bar assemblies comprises a plurality of pairs of crossed bars connected to each other;
   four wheels, each being attached to a bottom end portion of a respective one of the telescoping pole assemblies;
   a pliable liner that is connected to the frame and that defines an open-top interior compartment of the wagon when the wagon is in the wagon's expanded configuration; and
   a tow handle, the tow handle being connected to the frame.

9. The wagon in accordance with claim 8 wherein the tow handle is telescopically collapsible.

10. The wagon in accordance with claim 8 wherein the wagon is configured such that two of the wheels can only revolve about a fixed common axis and the other wheels revolve about axes that are able to pivot relative to the fixed common axis.

11. The wagon in accordance with claim 8 wherein the wagon further comprises a collapsible bottom support assembly, the bottom support assembly comprises a central hub and four bars, the four bars are each pivotally connected to the central hub and to the bottom end portion of a respective one of the telescoping pole assemblies.

12. The wagon in accordance with claim 11 wherein the central hub allows each of the four bars of the bottom support assembly to pivot downward therefrom and prevents the four bars from pivoting upward therefrom beyond horizontal.

* * * * *